United States Patent [19]
Grover

[11] Patent Number: 4,755,993
[45] Date of Patent: Jul. 5, 1988

[54] TRANSMISSION SYSTEM USING FORWARD ERROR CORRECTION

[75] Inventor: Wayne D. Grover, Edmonton, Canada

[73] Assignee: Northern Telecom Limited, Montreal, Canada

[21] Appl. No.: 886,128

[22] Filed: Jul. 16, 1986

[51] Int. Cl.$^4$ .............................................. H04J 3/12
[52] U.S. Cl. ................................. 370/110.1; 370/102
[58] Field of Search ............ 370/102, 104, 105, 110.1; 371/37, 49

[56] References Cited

U.S. PATENT DOCUMENTS 3,412,380 11/1968 Heller et al. ........................... 371/37
3,931,473 1/1976 Ferris, Jr. ............................ 370/102
4,053,715 10/1977 Drapkin .............................. 370/102
4,224,473 9/1980 Kaul et al. ........................... 370/102
4,507,779 3/1985 Barner, Jr. et al. ................. 370/105
4,616,361 10/1986 Strehl .............................. 370/110.1
4,689,790 8/1987 Lacroix et al. .................... 370/110.1

Primary Examiner—Salvatore Cangialosi
Attorney, Agent, or Firm—R. John Haley

[57] ABSTRACT

In a high-speed fiber-optic transmission system, data streams are synchronized using fixed stuffing before being multiplexed for transmission. The fixed stuffing information is replaced with forward error correction (FEC) information, whereby FEC is effected without any increase in transmission speed. FEC information blocks of each data stream can be synchronized to the frame timing of the transmission system, or they can be relatively unsynchronized. In the latter case, an FEC decoder acts in a self-framing manner to synchronize itself to the FEC information blocks of the respective data stream.

10 Claims, 3 Drawing Sheets

TRANSMISSION SYSTEM USING FORWARD ERROR CORRECTION

This invention relates to the processing (e.g. for transmission or storage) of information, and is particularly concerned with a transmission system using FEC (forward error correction).

Transmission systems are increasingly being required to transmit digital information at higher bit rates and over increasing distances. To this end, optical transmission systems have been developed in which an optical signal from a source such as a laser is modulated with the digital information, for example at a rate of about 570 Mb/s, and is transmitted via an optical fiber over a large distance for example 40 km or more.

It is a requirement in any transmission system to achieve a low error rate. In high speed optical transmissions, a major limiting factor in achieving a low error rate is dispersion. In order to minimize dispersion, it has been necessary to impose close tolerances on the optical signal source, to ensure that the optical signal has a narrow bandwidth centered at a wavelength at which the optical fiber used has a minimum dispersion.

In order to compensate for errors in transmission systems, it is known to use FEC (forward error correction). FEC involves the determination at the transmitter of an error control code, which is then transmitted with the digital information and used at the receiver to check for and correct errors which may have occurred in the transmission. FEC, which is particularly suited to the correction of single bit errors, thus involves no retransmission of the digital information. However, the need to transmit the error control code using FEC imposes an undesirable increase in the rate at which information must be transmitted, promoting incompatibility between systems which use FEC and systems which don't use FEC. Furthermore, this increase in information transmission rate makes it difficult and expensive to apply FEC to existing transmission systems to improve their performance.

An object of this invention, therefore, is to provide an improved method of processing information for example for transmission.

According to one aspect of this invention there is provided a method of processing information including fixed positive stuffed information, comprising the step of replacing at least some fixed positive stuffed information with error control information.

Thus in accordance with this invention applied to the transmission of information (it could equally be applied to the storage of information), fixed positive stuffing information is replaced with forward error correction information, whereby forward error correction can be effected without any change in transmission speed and hence compatibly with existing transmission systems.

The invention further provides a method of processing information comprising the steps of: synchronizing a data stream to an increased frequency using fixed positive stuffing; producing forward error correction (FEC) information from the data stream; and replacing at least some of the fixed positive stuffing information with the FEC information.

According to another aspect this invention provides a method of transmitting information comprising the steps of: processing information in respect of a plurality of data streams by the method as recited above, multiplexing the processed data streams together in time division multiplexed frames; and transmitting the multiplexed data streams.

The invention also provides apparatus comprising synchronizing means for synchronizing a data stream, the synchronizing means including means for adding fixed stuffing information to the data stream; and means for replacing at least some of the fixed positive stuffing information with the FEC information.

According to a further aspect of this invention there is provided apparatus for transmitting a plurality of data streams comprising: synchronizing means for each data stream for synchronizing the data stream using fixed positive stuffing; means for multiplexing the synchronized data streams together for transmission in time division multiplexed frames; and, in respect of at least one of the data streams: forward error correction (FEC) means for producing FEC information from the respective synchronized data stream; and means for replacing at least some of the fixed positive stuffing information of the respective data stream with the FEC information.

In this respect it should be appreciated that in accordance with the invention FEC can be applied selectively to some data streams and not to others, even though all of the data streams are effectively multiplexed together for transmission, whereby a particularly low error rate can be achieved on the selected data streams. Such an advantageous arrangement is not possible in the prior art.

The FEC means preferably comprises means for producing an error control code in respect of a block of information of the respective data stream which is multiplexed in a plurality of said time division multiplexed frames, and conveniently also includes timing means for synchronizing each block of information of a respective data stream to said time division multiplexed frames.

Such synchronizing is not, however, essential; the FEC information blocks may instead be unsynchronized with respect to the time division multiplexed frames. In this case, it is necessary at a receiver to identify the timing of the FEC information blocks for proper FEC operation. To this end, apparatus for effecting forward error correction (FEC) of a data stream including bits of error control codes periodically multiplexed therein, each error control code relating to a respective block of information of the data stream, can comprise: FEC decoding means for producing error correction information from blocks of information of the data stream; correction means responsive to the error correction information to correct errors in the data stream; and control means responsive to the error correction information representing a high error rate for inhibiting the correction means and controlling the FEC decoding means to modify its timing of said blocks of information of the data stream; whereby operation of the FEC decoding means is synchronized to the blocks of information of the data stream in dependence upon the error correction information.

The invention will be further understood from the following description with reference to the accompanying drawings, in which.

In order to provide a full understanding of the embodiments of the invention described below, it is first necessary to describe some aspects of a transmission system to which the invention is applied.

Figure 1:
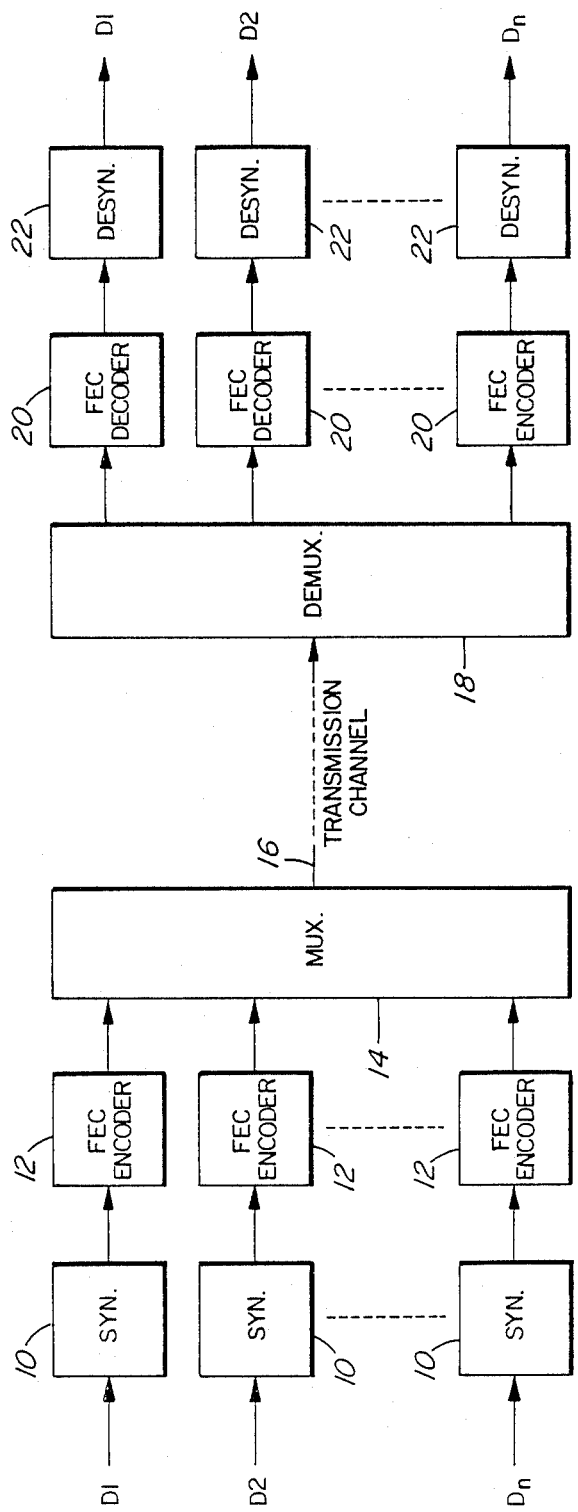
FIG. 1 illustrates in a block diagram a known physical arrangement of a transmission system using FEC (forward error correction)

Referring to FIG. 1, parts of a high-speed transmission system are shown. Each of a plurality of incoming time division multiplexed data signals D1 to Dn is synchronized in a respective synchronizer 10 and supplied via a respective FEC encoder 12 to a common multiplexer 14, which multiplexes the FEC encoded data signals together for transmission over a high speed transmission channel 16. The channel 16 may, for example, comprise an optical signal modulator and transmitter, an optical fiber, and an optical signal receiver and demodulator which are not shown individually. A demultiplexer 18 demultiplexes the data signals for supply to respective data paths via respective FEC decoders 20 and desynchronizers 22.

In such a known arrangement, each FEC encoder 12 adds error control information to the data of the respective data channel, thereby increasing the bit rate of information supplied to the multiplexer 14 compared to the bit rate of information supplied by the respective synchronizer 10. In the corresponding FEC decoder 20, this error control information is used to correct errors in the transmitted channel data, and the error-corrected data is supplied to the respective desynchronizer 22 at a lower bit rate than that incoming to the FEC decoder 20.

Figure 2:
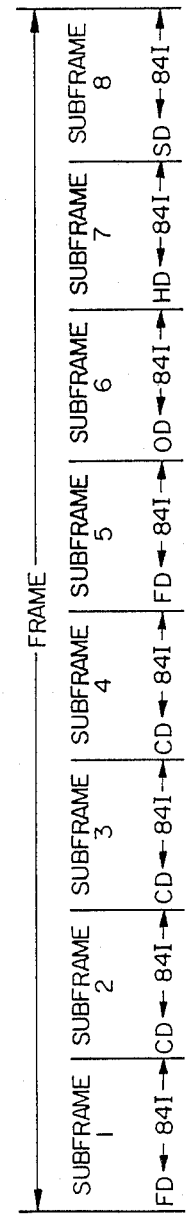
FIG. 2 illustrates a framing format of a known transmission system.

FIG. 2 illustrates a framing format of a known transmission system in which FEC is not used; in other words the FEC encoders 12 and decoders 20 of FIG. 1 are not present, the outputs of the synchronizers 10 being supplied directly to the multiplexer 14 and the outputs of the demultiplexer 18 being supplied directly to the desynchronizers 22.

As illustrated in FIG. 2, each frame comprises 8 subframes each of 86 bits, the frame comprising a total of 688 bits. The first bit in each subframe constitutes system overhead information, and is a framing bit F in each of subframes 1 and 5, one of three identical stuff indicator bits C in subframes 2 to 4, a high-speed communications bit H in subframe 7, a service channel bit S in subframe 8, and other overhead information 0 in subframe 6. The framing bits F not only identify the frame and subframe timing, but also the timing of masterframes each of which in this example comprises 12 frames. The stuff indicator bits C in each frame relate to a specific one of 12 data channels D1 to Dn (i.e. n=12), whereby 3 bits C are provided for each data channel in each masterframe.

Each subframe also includes a second bit D and 84 information bits I. The bit rate of the framing format is selected so that each of the 12 data channels D1 to Dn can be constituted by a DS3 signal at a nominal bit rate of 44.736 Mb/s. Seven bits of each of the 12 data channels are multiplexed together to form the 84 information bits in each subframe. This enables the 8 D bits in each frame collectively to accommodate a DS2 signal at a nominal bit rate of 6.312 Mb/s.

However, it is also desirable for high-speed transmission systems to be able to accommodate higher bit-rate signals, for example so-called DS4E signals having a nominal bit rate of 139.264 Mb/s, and multiplexed DS3 signals, which may already exist on "135 Mb/s" fiber optic transmission systems, having a nominal bit rate of for example 135.51 Mb/s. To this end, the bit rate is increased slightly so that groups of 3 of the data channels can be replaced by either of these higher bit-rate signals. In this example, the bit rate for the framing format is selected to be 570.48 Mb/s.

As a result of this increase in bit rate, fixed positive stuffing, in addition to variable positive stuffing necessary to accommodate frequency tolerances, must be used to pad out the lower bit rate signals so that they are properly transmitted. The following table summarizes the various rates of transmission and stuffing for the signals discussed above.

| Signal | DS4E | 135 Mb/s | DS3 | DS2 | |
|---|---|---|---|---|---|
| Nominal bit rate | 139.264 | 135.51 | 44.736 | 6.312 | Mb/s |
| Bits/subframe | 21 | 21 | 7 | 1 | |
| Allocated bit rate | 139.303 | 139.303 | 46.434 | 6.634 | Mb/s |
| Fixed stuff rate | 0 | 3.731 | 1.658 | 0.322 | Mb/s |
| Nominal variable stuff rate | 0.039 | 0.062 | 0.040 | 0 | Mb/s |

Thus fixed positive stuffing takes place for all but the DS4E signals. For the DS3 signal, this fixed stuffing i.e. positive stuffing in each frame, is constituted by one of the 7 bits in each of subframes 2 and 6 of each frame for the respective channel being a stuff bit (2 bits/frame equals 1.658 Mb/s). For the 135 Mb/s signal, the fixed stuffing is constituted by one of the bits in each of subframes 2, 4, 6, and 8 in each frame, and one addititonal bit in every second frame, being a stuff bit.

Now in accordance with this invention, at least some of these fixed stuff bits are used to transmit FEC error control information for the respective channel. Thus the provision of an FEC encoder in this case avoids any increase in the bit rate of the signal to be handled by the multiplexer, whilst still providing the necessary error control information. Thus FEC encoders and decoders can conveniently be added to existing transmitters and receivers, at relatively low cost. Furthermore, a receiver which has no FEC decoder can receive signals from a transmitter with an FEC encoder (without the advantages provided by the FEC, of course), because there is no change in transmitted bit rate or format and because the receiver discards the fixed stuff bits.

In the following description, for simplicity and clarity and by way of example, reference is made only to the application of FEC to DS3 signals. It should be appreciated that the same techniques are applicable to the 135 Mb/s and DS2 signals, and to other signals in which fixed stuffing is used, and that the invention is equally applicable thereto.

From the above description, it can be seen that each DS3 channel provides 7 bits in each subframe, and hence 56 bits in each frame, of which 2 bits are fixed stuffing bits which can be used for FEC error control information. For single error correction, an N-bit error control code can indicate the position of a single error in, or indicate that there is no single error in, a block of up to $2^N-1$ bits. With 1 bit for an FEC error control code for every 28 bits of information, a value of N=8 is reached before $2^N-1$ (=255) is equal to or greater than N×28 (=216). Thus an 8-bit single error correcting FEC code can be used for correction of single errors in a block of 4 frames of data of a DS3 channel.

To this end, a (224,216) code (i.e. a block of 224 bits, comprising 216 information bits and 224−216=8 error control code bits, is protected by 8 error control code bits) is used. This is derived in known manner by shortening a (255,247) perfect cyclic code, the generator polynominal used being $X^8+X^4+X^3+X^2+1$.

Figure 3:
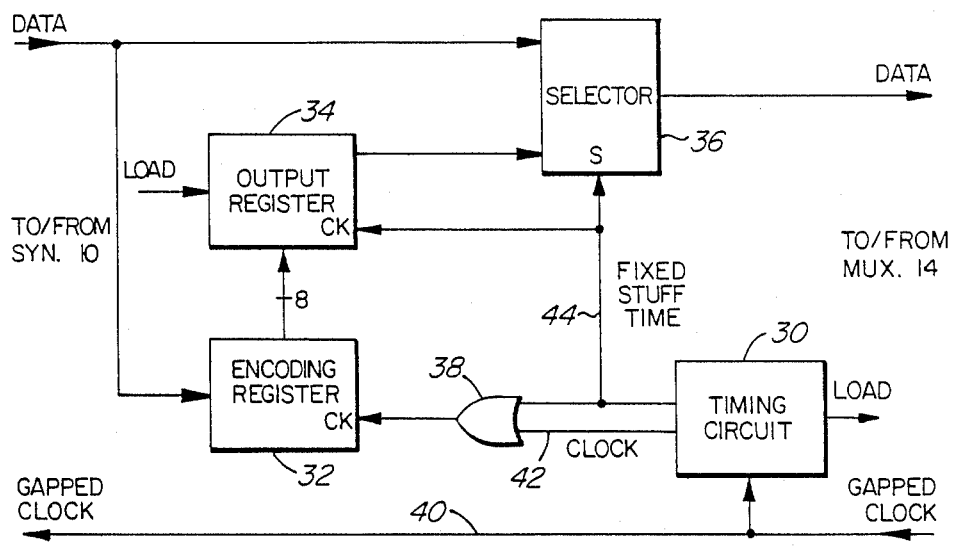
FIG. 3 illustrates in a block diagram an FEC encoding arrangement which operates in accordance with an embodiment of the invention.

FIG. 3 illustrates an encoding arrangement for effecting the FEC encoding and replacing the fixed stuff bits with the error control bits. The encoding arrangement comprises a timing circuit 30, an 8-bit encoding register 32, an 8-bit output register 34, a data selector 36, and an OR gate 38. The timing circuit 30 serves to regenerate, from a 46.434 MHz gapped clock signal supplied on a line 40 from the multiplexer 14 to the respective synchronizer 10, a 46.434 MHz clock signal on a line 42 and a fixed stuff time signal on a line 44. These signals may instead be derived directly from the multiplexer 14 or synchronizer 10, in which case the timing circuit can be dispensed with.

The 46.434 MHz clock signal, with the fixed stuff time clock pulses (occurring every 28th regular clock pulse) gated out by the gate 38, is applied to a clock input CK of the encoding register 32, to a serial input of which data incoming from the synchronizer 10 is supplied. The encoding register 32 implements the FEC encoding syndrome described above on a block of 216 data bits (including any variable stuff bits which for FEC purposes are treated in the same manner as data) but not on the fixed stuff bits within this block. At the end of this block, and hence after a time corresponding to 4 frames as shown in FIG. 2, under the control of a signal LOAD also produced by the timing circuit 30, the contents of the encoding register 32 are loaded into the output register 34. During the next 4 frames, under the control of the fixed stuff time signal on the line 44 which is supplied to a clock input CK of the output register 34 and to a select control input S of the selector 36, the 8-bit contents of the output register 34 are supplied via the selector 36 to the data output of the multiplexer 14 in place of the fixed stuff bits, while the incoming data is supplied to the encoding register 32 for generation of another 8-bit error control code.

Thus the error control code bits for each block of 216 data bits are transmitted in place of the fixed stuff bits in the next block of 216 data bits. These blocks can be, but as described below need not be, synchronized to the framing format described above by synchronizing the signal LOAD to this framing format.

Figure 4:
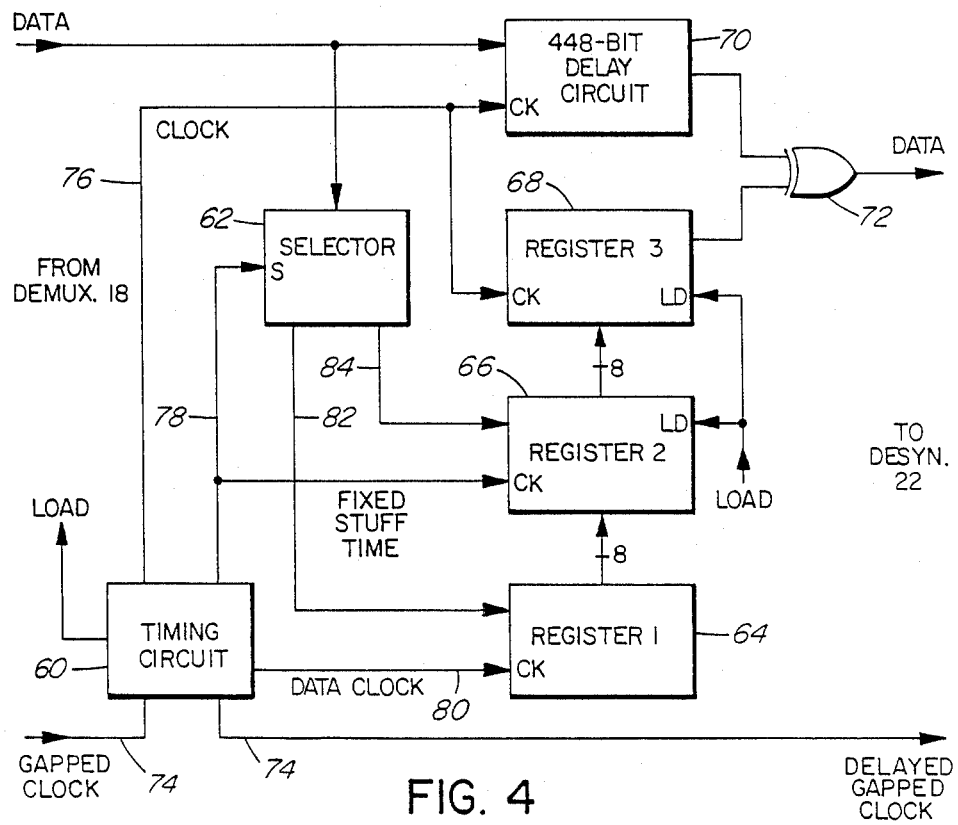
FIG. 4 illustrates in a block diagram an FEC decoding arrangement which operates in accordance with an embodiment of the invention.

FIG. 4 illustrates a corresponding FEC decoding arrangement, which includes a timing circuit 60; three 8-bit registers 64, 66 and 68, numbered 1 to 3 respectively, having clock inputs CK and parallel load control inputs LD, a 448-bit delay circuit 70, and an exclusive-OR gate 72. As in the encoder, in the decoder the timing circuit 60 is provided to regenerate from a gapped clock signal on a line 74 signals which could instead be derived from the demultiplexer 18 or the respective desynchronizer 22. These signals include a 46.434 MHz clock signal on a line 76 supplied to the clock inputs CK of the third register 68 and the delay circuit 70; a fixed stuff time signal, occurring every 28 clock pulses, on a line 78 supplied to the select control input S of the selector 62 and to the clock input CK of the second register 66; a data clock, corresponding to the clock signal on the line 76 with the fixed stuff time clock pulses removed, supplied on a line 80 to the clock input CK of the first register 64; and a signal LOAD, supplied to the inputs LD of the second and third registers 66 and 68, which is produced once every 224 clock pulses on the line 76.

The decoder operates on a pipeline processing basis. During a first block of 224 bits, the 216 data bits occurring at other than the fixed stuff times are passed via the selector 62 and a line 82 to the first register 64, which implements the FEC decoding syndrome. At the end of this block, with the signal LOAD the 8-bit contents of the first register 64 are transferred to the second register 66, which is identical to the first register 64 and is clocked at the fixed stuff times to complete the FEC decoding syndrome on the respective FEC error control code bits in the next data block, which are supplied to this register 66 via the selector 62 and a line 84. At the same time, the first register 64 acts on another block of data bits as described above.

At the end of this second block of data, with the signal LOAD the contents of the first and second registers are transferred to the second and third registers, respectively, and the first data block then reaches the output of the delay circuit 70 at the same time that the third register 68 produces any necessary error correction pulses, whereby any single error in the data block is corrected by the gate 72, from the output of which the corrected data is supplied to the respective desynchronizer 22. At the same time, the first and second registers 64 and 66 act on subsequent blocks of data as described above.

As the delay circuit 70 introduces a 448-bit delay in the data path to the desynchronizer, and the gapped clock signal on the line 74 includes not only gaps at the fixed stuff times but also at variable stuff times, the timing circuit 60 similarly delays the gapped clock by a 448-bit delay to supply a correspondingly delayed gapped clock signal on a line 74' to the desynchronizer 22.

The FEC decoder as described above operates in synchronism with the framing format of FIG. 2. In other words, successive 224-bit FEC frames correspond, for each DS3 channel, to the data in frames 1 to 4, 5 to 8, and 9 to 12 of the 12-frame masterframe already described. Whilst this is convenient for the particular FEC code and framing format used, it requires the supply of frame and masterframe signals (not shown) to the encoder and decoder for synchronization puposes. More significantly, such a convenient matching of FEC frames and system frames may not occur in a general situation with other FEC codes and framing formats.

Figure 5:
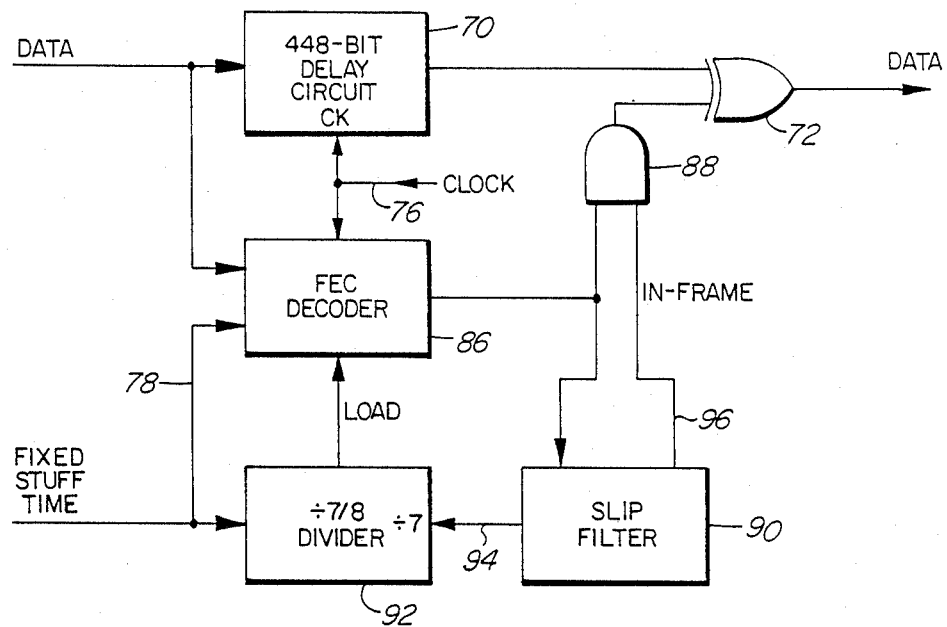
FIG. 5 illustrates in a block diagram a modified FEC decoding arrangement which operates in a self-framing manner.

Accordingly, FIG. 5 illustrates a modified form of FEC decoder which is self-framing. In FIG. 5, for the sake of clarity and simplicity the timing circuit 60 of FIG. 4 is not shown, the selector 62 and registers 64, 66, and 68 of FIG. 4 are shown collectively in a single FEC decoder block 86, and other elements of the decoder of FIG. 4 are given the same references in FIG. 5. In addition, the FEC decoder of FIG. 5 includes an AND gate 88, a slip filter 90, and a frequency divider 92.

The FEC decoder 86, delay circuit 70, and gate 72 in the decoder of FIG. 5 operate in exactly the same manner as in the decoder of FIG. 4, except that the error correction signal produced by the FEC decoder 86 and supplied to the gate 72 is now passed via the AND gate 88, and the signal LOAD is supplied by the frequency divider 92 instead of by the timing circuit.

The error correction signal produced by the FEC decoder 86 is also supplied to the slip filter 90, which can have a form known in the art of synchronization circuits and which selectively produces a slip control signal on a line 94 and an in-frame signal on a line 96. The frequency divider 92 is normally a ÷8 divider which produces the signal LOAD in response to 8 pulses of the fixed stuff time signal on the line 78, and hence every block of 224 incoming data bits. In response to the slip control signal on the line 94, the division factor of the divider 92 is changed to 7 whereby an FEC framing slip by one fixed stuff time pulse (i.e. 28 bits of incoming data) is effected in the timing of the signal LOAD.

In this manner, the FEC blocks of 224 data bits, and hence the FEC frames, are quickly identified from the fixed stuff time signal without dependence on any relationship of these blocks to the system frames and masterframes. After identification of the FEC frames in this manner, the slip filter produces the in-frame signal on the line 96 to enable the AND gate 88, whereby correction of single bit errors in the gate 72 is effected as already described. In the in-frame condition there is typically not more than one error per frame to be corrected, whereas in an out-of-frame condition the FEC decoder produces many correction bits per frame, whereby the slip filter 90 is able easily to distinguish between the two conditions.

It should be appreciated that the FEC framing acquisition time does not adversely affect the system frame acquisition time; the gate 88 is merely inhibited during the FEC frame acquisition time so that no error correction takes place. On the contrary, the in-frame signal on the line 96 can conceivably be used to facilitate acquisition of the system frame.

Whilst particular embodiments of the invention have been described in detail, it should be appreciated that numerous modifications, variations, and adaptations may be made thereto without departing from the scope of the invention as defined in the claims.

What is claimed is:

1. A method of processing information including fixed positive stuffed information, comprising the step of replacing at least some fixed positive stuffed information with error control information.

2. A method as claimed in claim 1 wherein the error control information comprises forward error correction information.

3. A method of processing information comprising the steps
    synchronizing a data stream using fixed positive stuffing;
    producing forward error correction (FEC) information from the data stream; and
    replacing at least some of the fixed positive stuffing information with the FEC information.

4. A method of transmitting information comprising the steps of:
    processing information in respect of a plurality of data streams by the method of claim 3;
    multiplexing the processed data streams together in time division multiplexed frames; and
    transmitting the multiplexed data streams.

5. A method as claimed in claim 4 wherein for each data stream the FEC information comprises an error control code in respect of a block of information of the data stream which is multiplexed in a plurality of said time division multiplexed frames.

6. A method as claimed in claim 5 wherein for each data stream said block of information comprises all of the information of the respective data stream contained in an integral number of said time division multiplexed frames.

7. Apparatus comprising:
    synchronizing means for synchronizing a data stream, the synchronizing means including means for adding fixed positive stuffing information to the data stream;
    forward error correction (FEC) means for producing FEC information from the stuffed data stream; and
    means for replacing at least some of the fixed positive stuffing information with the FEC information.

8. Apparatus for transmitting a plurality of data streams comprising:
    synchronizing means for each data stream for synchronizing the data stream using fixed positive stuffing;
    means for multiplexing the synchronized data streams together for transmission in time division multiplexed frames; and, in respect of at least one of the data streams;
    forward error correction (FEC) means for producing FEC information from the respective synchronized data steams; and
    means for replacing at least some of the fixed positive stuffing information of the respective data stream with the FEC information.

9. Apparatus as claimed in claim 8 wherein the FEC means comprises means for producing an error control code in respect of a block of information of the respective data stream which is multiplexed in a plurality of said time division multiplexed frames.

10. Apparatus as claimed in claim 9 and including timing means for synchronizing each block of information of a respective data stream to said time division multiplexed frames.

* * * * *